US008260126B2

(12) United States Patent
Lord et al.

(10) Patent No.: US 8,260,126 B2

(45) Date of Patent: Sep. 4, 2012

(54) DUAL WALL AXIAL FLOW ELECTRIC HEATER FOR LEAK SENSITIVE APPLICATIONS

(75) Inventors: Stephen Michael Lord, Encinitas, CA (US); Kurt Lund, Del Mar, CA (US)

(73) Assignee: Lord Ltd., LP, San Diego, CA (US)

( * ) Notice: Subject to any disclaimer, the term of this patent is extended or adjusted under 35 U.S.C. 154(b) by 498 days.

(21) Appl. No.: 12/653,694

(22) Filed: Dec. 17, 2009

(65) Prior Publication Data

US 2011/0150440 A1 Jun. 23, 2011

(51) Int. Cl.
*F24H 1/10* (2006.01)
*A47J 31/00* (2006.01)

(52) U.S. Cl. ........................................ 392/486; 392/465

(58) Field of Classification Search .................. 392/486, 392/465-506, 314-382

See application file for complete search history.

(56) References Cited

U.S. PATENT DOCUMENTS 1,671,993 A * 6/1928 McTarnahan ................. 219/201
1,791,095 A * 2/1931 Hicks ............................ 392/462
1,966,339 A * 7/1934 Enochsen ..................... 392/445
2,419,429 A * 4/1947 Voiles ........................... 392/486
2,987,604 A * 6/1961 Swoyer ......................... 392/495
3,617,699 A * 11/1971 Othmer ......................... 392/469
7,318,735 B2 1/2008 Fannin et al.
7,637,308 B2 * 12/2009 Hofer-Noser et al. .......... 165/47
8,103,156 B2 * 1/2012 McClanahan et al. ........ 392/491

OTHER PUBLICATIONS

Wellman Furnaces Inc., Radiant Coil Furnaces, Feb. 19, 2009.

* cited by examiner

*Primary Examiner* — Daniel L Robinson

(57) ABSTRACT

A dual wall axial flow electric heater for leak sensitive applications provides an improved corrosion and leak resistant assembly and includes protective tubes over electrical heater rods, double tubesheets spaced apart by a plenum and leak detectors positioned to sensor leaks through the walls of the protective tubes. The design includes the option of two or more tube bundles with each inserted into opposite ends of a shell surrounding the tube sheets and heaters. The design provides ease of maintenance since each heater rod can be replaced independently while the unit is in service. Variable heat flux is provided from standard single flux heater rods by providing protective tubes of varying diameters. A built-in thermowell is provided to allow the rod temperatures to be monitored directly. Hot spots are avoided by the use of turning baffles and vibration is avoided by use of spider baffles to support the tubes.

24 Claims, 17 Drawing Sheets

Schematic diagram illustrating the operation of the basic invention with one tube bundle, a side entrance and end exit.

FIGURE 1. Schematic diagram illustrating the operation of the basic invention with one tube bundle, a side entrance and end exit.

Figure 2. Schematic cutaway view of an extended embodiment with two tube bundles, a side entrance and an exit Figure 3. Schematic cutaway view illustrating the flow path of fluid through a standard shell and tube heat exchanger (Prior Art)

Figure 4. Schematic cutaway view illustrating the hot spots caused by the flow path of fluid through a standard shell and tube heat exchanger where the tubes have been replaced by electric heaters (Prior Art)

Figure 5. Schematic cross sectional view illustrating that axial flow avoids low flow zones and hot spots in a shell and tube heat exchanger with electrical heaters (Prior Art)

Figure 6. Cross sectional view of a heat exchanger incorporating features of the invention including a turning baffle Figure 7. Cross-sectional view of a spider baffle supporting a protective tube Figure 8. Cross-sectional view of a protective tube layout showing axial flow baffles and spacers Figure 9. Cross-sectional view of a protective tube layout showing axial flow baffles and spacers and use of spacers as extended surface area Figure 10. Cross-sectional view of a protective tube layout including a large center tube used as an axial flow baffle Figure 11. Cross-sectional view of protective tube layout showing use of square pitched tubes surrounded by an axial flow baffle Figure 12. Schematic diagram showing a portion of a heat exchanger illustrating an extended heat transfer area provided by use of radiation to a spacer and baffle Figure 13. Schematic diagram illustrating providing a variable flux by changing the protective tube diameter Figure 14. Cross-sectional view illustrating a prior art use of welding a thin sheathed heater rod into a support plate (Prior Art)

Figure 15. Detailed Cross sectional view showing the sealing of a heater rod and a protective tube to separate plates Figure 16. Side view of an insertable temperature sensor Figures 17 and 18. End and longitudinal views of the heater rod with a center thermowell surrounded by the heater coils.

DUAL WALL AXIAL FLOW ELECTRIC HEATER FOR LEAK SENSITIVE APPLICATIONS

This invention relates generally to the field of electric heating of fluids and more specifically to a Dual Wall Axial Flow Electric Heater for Leak Sensitive Applications.

DEFINITIONS

For the purposes of this disclosure the definitions of certain terms are set forth below A "heater rod" is an assembled heater in a swaged metal jacket which is inserted in a protective tube The assembled heater comprises three zones, namely the lead wire zone which extends outward from the cold junction, which has low heat output, a second zone comprising the heater proper, which has high heat output and a third zone comprising the cold toe, which has low heat output.

"Tie Rods" comprise multiple long metal rods used to fasten the baffle assembly together. One end of the tie rod is threaded into a tube sheet and the other end is secured, for example by nuts. The baffles have holes in them that match the tie rod positions and are slid over the tie rods and positioned longitudinally using spacers between the baffles.

"Spacers" are devices used to separate baffles in conjunction with tie rods. A spacer is usually a tube with a diameter greater than the hole in the baffle, through which the tie rod fits. The tie rod compresses the assembly of baffles and spacers to secure the assembly in place and prevent chatter. Since the spacers are compressed on both ends against either a baffle or a tube sheet there is very little fluid flow down the inside of the spacer. Thus spacers can be used to exclude flow from certain areas of the heat exchanger. In this embodiments described herein spacers are used for this purpose as well as for baffle separation. Thus the cross-sectional shape of the spacers may be different from the commonly used tube in order to provide a desired shape to the flow in the flow area.

A "protective tube" is a tube inserted into the heater shell to separate the heater rod from fluid in the shell.

A "shroud" is a device located around the heater rod to straighten the flow by forcing the fluid to flow down a gap with a high length-to-gap ratio.

A "lead wire" is a wire that conducts electricity from outside the heater to the heater proper where most of the heat is generated.

A "cold junction" is the junction between the lead wire and the heater coils in the heater proper.

A "heater proper" refers to the section of the heater that is designed to be the primary source of heat and usually consists of high resistance heater wires or coils. It is located between the cold toe and the cold junction.

A "cold toe" is the section spaced from the heater lead wires where the heat generating coils are connected to each other by a U-Shaped piece of low resistance wire. This section is much cooler than the heater proper.

A "thermal expansion gap" is a gap provided to allow for differential thermal expansion of the heater rod inside the protective tube.

BACKGROUND

Gases and liquids are traditionally heated by shell and tube heat exchangers where a hot liquid or gas passing through the tubes provides the heat, which goes through the walls of the tubes, to heat the material passing through the heat exchanger on the exterior to the tubes. The shell contains the liquid or gas being heated and is usually cylindrical to provide a good pressure barrier. The pressure barrier at the ends of the cylinder is provided by a tube sheet into which the hollow tubes are swaged. However, many different designs are feasible. When the application is leak sensitive the exchanger is often provided with a double tube sheet with a gap between the tube sheets so that leaks can be prevented from going from the tube to the shell or vice versa and be observed so that repairs may be undertaken before a major leak occurs. As an alternative the heating fluid may be introduced in to the shell and the fluid to be heated may be passed through the interior of the tubes.

When greater temperatures are required than can be obtained from vapors, such as steam, or liquids used as thermal transfer fluids passing through the tubes, then electrical heaters are used in place of the tubes. However, electrical heaters present certain limitations compared to shell and tube heat exchangers. At least two basic designs are used: a furnace design where the fluid flows through tubes located inside an electrically heated furnace or a direct immersion design where the fluid flows over the heater rods which are directly inserted in a conduit of some kind.

One example of a furnace design is referred to as a radiant coil furnace (see Wellman design) in which a coiled pipe containing a gas is heated by electrical heater elements with the furnace walls containing the heat. The furnace usually has a lid or end plates through which the pipes protrude to make connection with the rest of the process. The pipes expand and move as they heat up. The furnace is not usually gas tight or pressure rated to allow for pipe movement and reduce cost.

A second example uses an immersion heater such as shown in U.S. Pat. No. 7,318,735 which is a flanged design in which multiple U-shaped heating elements are welded to a flange with wires connected to the electrical heaters extending out of the holes in the flange. The bundle of heater elements is placed inside an empty pipe and the liquid being heated enters and leaves from the side of the pipe.

Both types of design will release materials to atmosphere in the event of a leak in the tubes and will have to be shutdown for repairs. With corrosive materials the probability of the leak increases: many corrosive materials are also toxic thus providing a serious health hazard. Despite this leak potential, leak detection systems are not usually provided to warn the operator. Corrosion increases rapidly with temperature so any hot spots on the tube will corrode much faster. With the furnace design there is also some shadowing of parts of the tube so some parts are hotter than others. With the immersion design some areas may have poor flow and are thus unable to remove the heat and become hot spots. This is particularly the case with corrosive gases which are more difficult to heat.

It can be seen from FIG. 1 of U.S. Pat. No. 7,318,735 that the fluid comes in from the side and thus must turn to go down and out the exit. Such changes in direction create areas of low flow in the transition from cross flow to axial flow which can create hot spots. In the '735 patent there is no mechanism to aid in this transition. Also, it is a characteristic of electrical heaters that the heat emitted per unit length is constant; thus, if this heat is not removed evenly from the whole area of the heater, "hot spots" can develop. This is not the case for shell and tube heat exchangers as areas of low heat transfer simply do not transfer heat thus the hot spot problem is much less severe. Thus it is not possible to use standard shell and tube designs with electrical heat as the typical cross flow baffles cause hot spots. Also it can be seen that the failure of one heater tube or wire requires removal of the entire assembly to repair the failure. This adds to the cost of operation as is discussed in U.S. Pat. No. 7,318,735. However, the solution presented therein also has problems in that the unit must be shutdown and dismantled in order to weld on the header plate.

A further problem with corrosive materials is that they typically have an upper temperature which should not be exceeded. This then limits the flux which may be used at the hot end of the heater. However, since heaters typically have a single flux this can mean there is also a low flux at the cold end and thus the overall heater is much bigger. One solution to this is a variable flux rate where the flux is higher at the cold end than at the hot end, but such heaters are more expensive to make and are not readily available. A further disadvantage is the absence of methods to measure the heater temperature and thus be aware if a heater is overheating. It is possible to put separate thermowells through the header plate but this requires more room and additional penetrations of the plate and each thermowell only measures the point on the heater that it contacts.

BRIEF SUMMARY

Objects of the embodiments of the invention include, but are not limited to, providing improved safety by reducing the risk of leaks and by pre-release leak detection, low cost of ownership, a variable flux along the heater length, a reduction in hot spots which can increase corrosion rates, and a reduction or elimination of overheating of the heater.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a Dual Wall Axial Flow Electric Heater for Leak Sensitive Applications comprising:

A shell, to contain a leak sensitive fluid to be heated, the shell having at least one end connection for a tube sheet, and at least a first and a second connection for either a fluid entrance or exit which may be either a side or an end connection,

- a primary and secondary tube sheet where the primary tube sheet is connected to the end connection of the shell and the secondary tube sheet is connected to the primary tube sheet either directly or via a conduit,
- at least one heater rod inside a bayonet protective tube where the protective tube is closed at one end and thus free to expand and the other end is sealed to the primary tube sheet, the heater rod being sealed to the secondary tube sheet, and
- at least one flow turning baffle located either after the fluid entrance or before the fluid exit.

A further leak protection comprises a conduit between the primary and secondary tube plate designed to withstand the process pressure and to provide a pressure transmitter and alarm to both contain a leak through a protective tube and to provide an alarm that a leak has occurred. It is then possible to temporarily take the unit out of service while an emergency repair is conducted by removing the heater rod and plugging the leaking protective tube as is standard practice with shell and tube heat exchangers. It is further preferred that each heater rod is individually pressure sealed to the secondary tube plate so that it may be removed and replaced while in service if the heater rod fails and that the inside of the protective tube and the outside of the heater rod have a high emissivity coating to enhance radiation transfer between them. Further cost reduction can be obtained by use of a second tube bundle inserted at the opposite end to the first bundle. The additional design flexibility of variable flux can be obtained by increasing, or varying the diameter of the protective tube. A thermowell may be inserted in the center of the heater rod or the protective tube to directly measure the heater temperature at various locations.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION

While a descriptions of a preferred embodiment is provided herein, it is to be understood that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
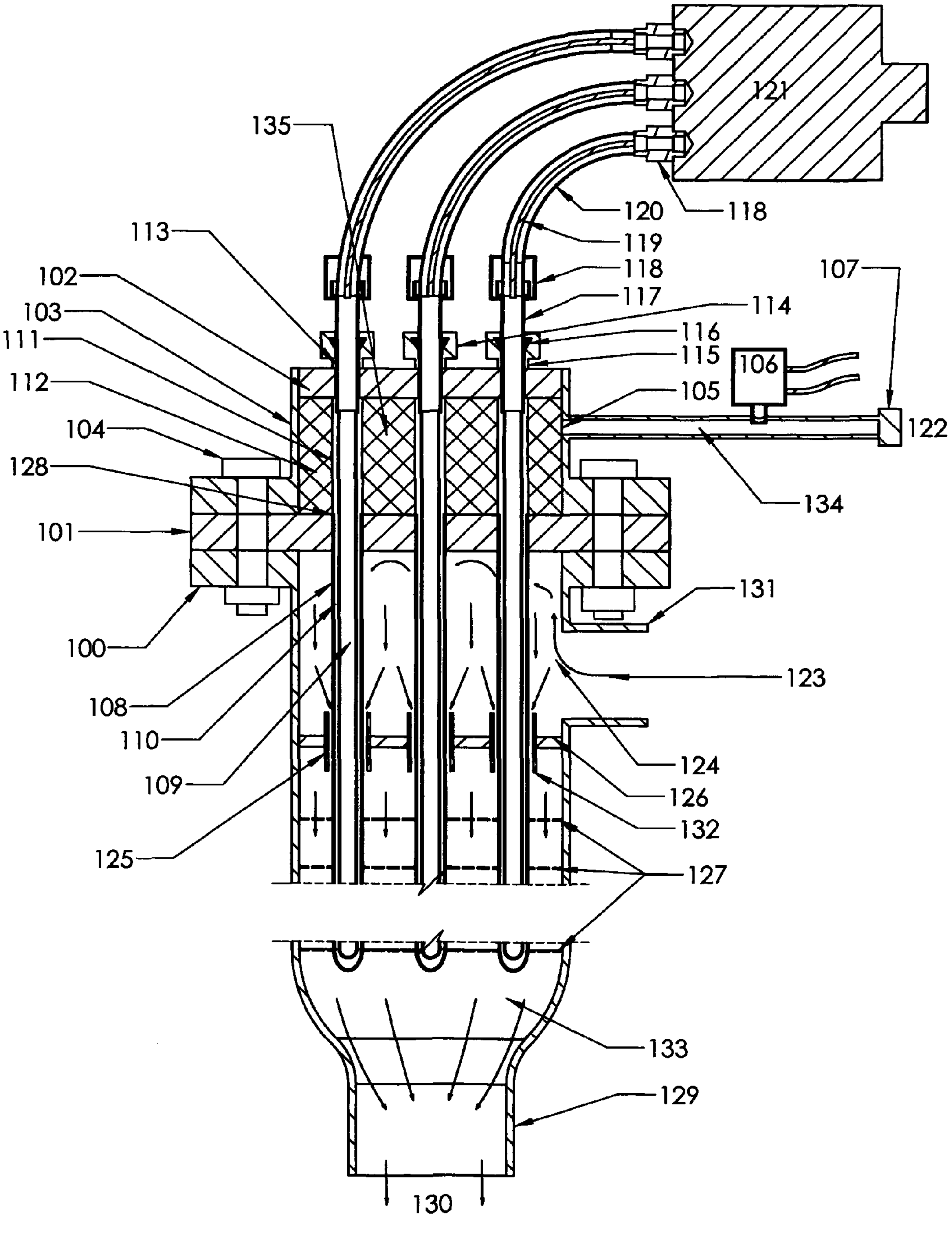
FIG. 1 is a schematic cutaway view of a basic heat exchange unit incorporating features of the invention, the unit having one tube bundle, a side entrance and an end exit.

FIG. 1 is a schematic diagram of the concept of the basic embodiment of the invention. The upper portion includes a dual tube sheet arrangement similar to dual tube sheets used in conventional shell and tube heat exchangers. To avoid cross-contamination between the heat exchange fluid and the fluid being heated, since there is only one fluid being heated, the tube sheets constitute the top of the dual wall. The secondary protection consists of the plenum 135 between the primary tube sheet 101, which is connected to the secondary tube sheet 102 by a flanged conduit 103, which is in turn welded to the secondary tube sheet 102 and secured to the primary tube sheet 101 with bolts 104, which also secure the assembly to the shell 100. A penetration 105 is provided to a conduit 134, which leads to a leak detector 106, which can be one of various devices such as a pressure or temperature transmitter, conductivity or density detector or gas chromatograph, and a fill and purge connection 107. In conventional shell and tube heat exchangers with double tube sheets the penetration 105 is simply a leak hole and leak detection is done by the operator noticing something dripping from the hole, which is not acceptable for leak sensitive applications. Primary protection is provided by the primary tubesheet 101, the protective tube 108, and the tube sheet to tube seal 128. Preferably, the protective tubes 108 are expanded into the primary tube sheet 101 using standard heat exchanger manufacturing techniques and are preferentially also seal welded to the primary tube sheet 101 to further reduce the risk of leaks. The electric heater rods 109 are inserted into the protective tubes 108 with a clearance space 110 between them that is at least sufficient to allow for manufacturing tolerances, differential thermal expansion and possible increase in thickness due to corrosion. The heater rod 109 pass through holes 111 in an insulation block 112 through holes 113 in the secondary tube sheet 102, and through the individual pressure seals 114, which are welded via a short tube 115 to the secondary tube sheet 102. The pressure seals shown are standard bored through low leak rate compression fittings, such as manufactured by Swagelok or Parker and are sealed to the heater rods with ferrules 116 according to the manufacturers instructions. Other pressure seals are also feasible such as flanges and o-ring seals. The heater rods 109 may have an extension piece 117 of standard size tube welded onto the actual heater rod to improve the fit at the point where the seal is made. Compression seals are particularly advantageous because of the low leak rate and small foot print, they can be opened and remade several times for inspection purposes and new heater rods can be inserted directly through the pressure seals after the old ones are replaced. At the top end of the heater rods 109, there is a seal 118, to the conduit 120, and a bundle of insulated wires 119, which extend to a junction box 121. For industrial applications it is required practice to enclose the wires in a conduit 120, which may be rigid or flexible. Where the bundle of wires 119 also include thermocouple wires they should be shielded against the electromagnetic fields generated by the power wires. The location of the junction box is at the side so that individual heater rods 109, and the entire primary tubesheet 101, and secondary tube sheet 102, with the protective tube bundle, 108 can easily be removed.

Figure 7:
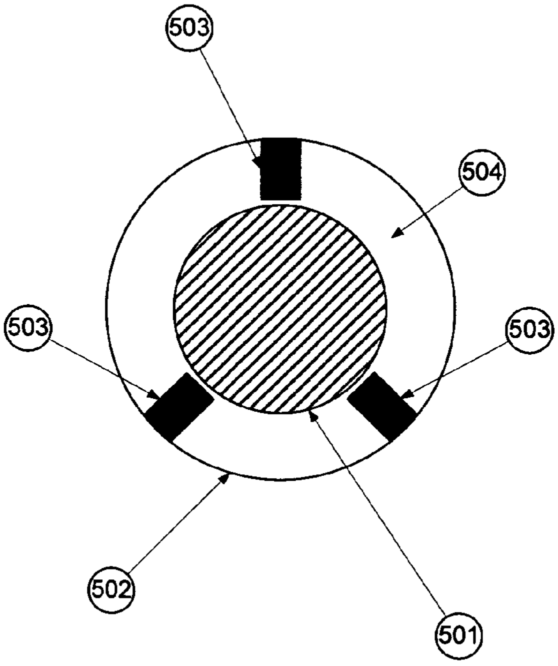
FIG. 7 is a cross sectional view of a spider baffle supporting a protective tube

The fill and purge connection 107 is used to pressurize the insulation-filled plenum 135 between the primary tube sheet 101 and the secondary tube sheet 102 and to fill the clearance space 110 around the tubes with a gas 122 that is inert to the materials of construction and to the process fluid 123. The gas 122 can also be used to swing purge the plenum 135 and clearance spaces 110 from process fluid 123 in the event of a leak which requires opening the top of the heat exchanger. The process fluid 123 enters through a side inlet 131 and impacts the sides of the protective tubes 108. The flow arrows 124 show the process fluid flow diverted upwards and around the top of the shell and then diverted downward to flow into the shroud part 125 of the turning baffle 126. The shrouds 125 function to straighten the fluid flow after the turbulent cross flow in the top portion of the shell. The gap 132 between the shroud and the protective tube provides a pressure drop which helps to evenly distribute the flow. The baffle 126 is supported by spacers (not shown) and spacer rods (not shown) from the primary tube plate as is standard practice in shell and tube heat exchangers. Additional spider baffles 127, such as shown in FIG. 7, which are tube support baffles with a very open structure, are located at several locations to reduce vibration of the protective tubes while minimizing flow disturbances. The fluid flow arrows 124 further show the axial flow of the process fluid 123 down the exchanger past the end 133 of the heaters and protective tubes and then out the center exit 129, the heated process fluid 130 continuing to a further conduit (not shown). An alternative is to provide a side exit but this requires a further turning baffle 126 to turn the fluid to flow out the side exit without causing upstream disturbances to the axial flow. A benefit of the embodiment is that both the heater rods 109 and the protective tubes 108 are bayonet style (i.e. unrestrained at the lower end) which means they are free to expand at the bottom and hence their thermal expansion does not put strain on the tube sheet to tube seal 128 which is known to be the area most likely to leak in a conventional shell and tube exchanger.

Figure 2:
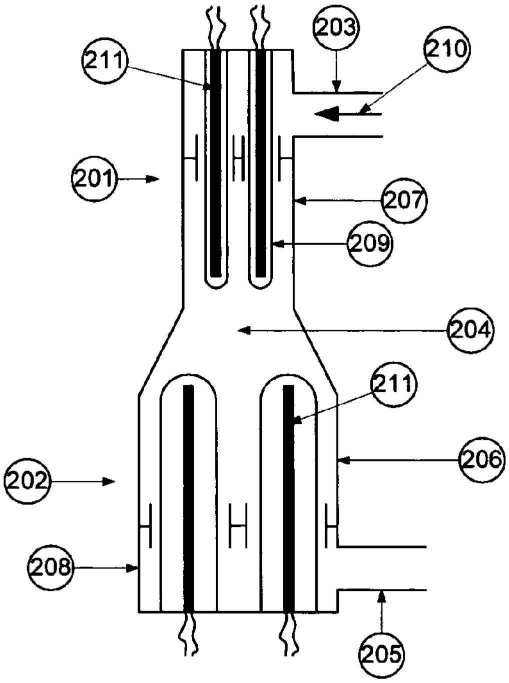
FIG. 2 is a schematic cutaway view of an extended embodiment with two tube bundles, a side entrance and an exit.

FIG. 2 shows a simplified schematic of a first and second heaters assembly 201, 202 each of which are shown in more detail in FIG. 1 with the bottom heater assembly 202, inverted in relationship to the upper heater assembly 201. In this embodiment the fluid 210 enters through a top side entrance 203 into the top heater assembly 201 and leaves through the center exit 204, which is also the center inlet for the bottom heater assembly 202, and leaves through the side exit 205. In this embodiment the bottom shell 206 has a larger diameter than the top shell 207 which allows the bottom protective tubes 208 to be of a larger diameter than the top protective tubes 209. The larger diameter protective tubes 208 have a lower heat flux in watts/sq.in. than the smaller diameter tube 209 for the same watts per linear inch. Thus, this is an example of a two stage heater with lower flux in the bottom heater. It is particularly advantageous for standardization purposes to use the same size heater rods 211 in both protective tubes 208, 209. It is also feasible to connect additional heaters in series by connecting the side exit 205 to the inlet of a further heater (not shown).

Figure 3:
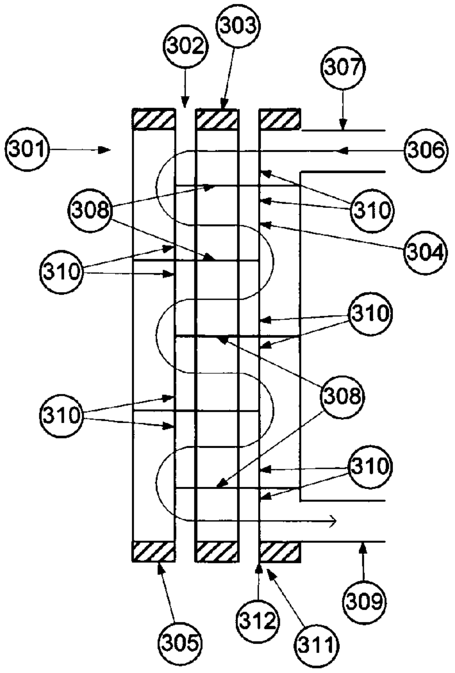
FIG. 3 is a schematic cutaway view illustrating the flow path of fluid through a standard shell and tube heat exchanger.
Figure 4:
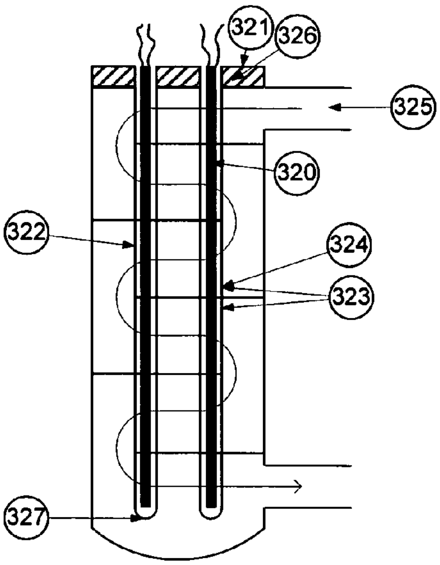
FIG. 4 is a schematic cutaway view illustrating the hot spots caused by the flow path of fluid through a standard shell and tube heat exchanger where the tubes have been replaced by electric heaters
Figure 5:
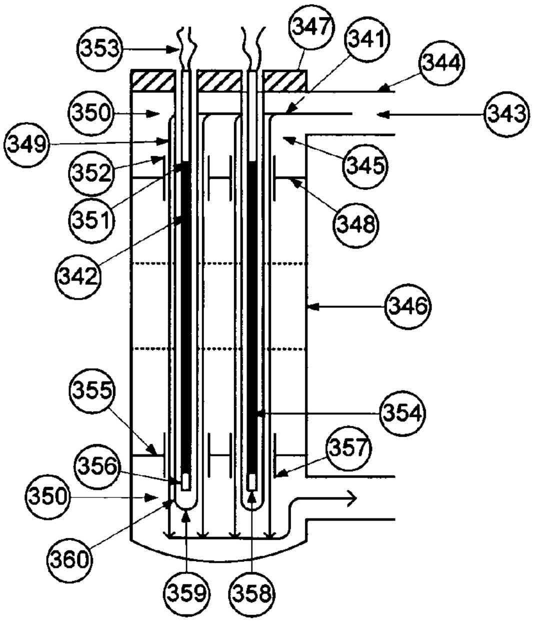
FIG. 5 is a schematic cross sectional view illustrating that axial flow avoids low flow zones and hot spots in a shell and tube heat exchanger with electrical heaters.

FIGS. 3, 4 and 5 show simplified flow schematics to illustrate the benefits of axial flow for a shell and tube exchanger heated by electricity. FIG. 3 shows a classic shell and tube heat exchanger 301. The hot fluid 302 flows through the inlet tube sheet 303, down the tubes 304 and out the bottom tube sheet 305. The cool fluid 306 flows in the side entrance 307 across the tubes 304 and is diverted by baffles 308 to repeatedly cross the tubes 304 before exiting through a side exit 309. At locations 310, where the flow is reversed by the blocking action of the baffle 308, the flow rate is very low and so the heat transfer is very low. A negative effect is that the hot fluid is not cooled at this location but the heat that is not exchanged is carried by the fluid to a location where it is exchanged. Thus the presence of low flow spots causes a loss in heat transfer. In this type of exchanger, the major source of leak 311 is at the connections 312 between the tube sheet, 303, 305, and the tube, 304 as they heat up and expand.

In FIG. 4 the hot fluid 302, of FIG. 3 is replaced by an inserted heater rod 320, the bottom tube sheet 305, is not needed and the protective tubes 322, are terminated with a cap 327, which allows the tubes 322, to expand freely, thus reducing the risk of leaks at the connection 326, between the tubes 322 and the top tube sheet, 321. The low flow locations 323 are in the same location as the low flow locations 310 in FIG. 3, but now the electrical heat which is not transferred cannot be carried down the protective tube 322, because there is no hot fluid to carry it. Thus a hot spot 324 can form on the protective tube 322 at the low flow locations 323. Hot spots are undesirable because they can lead to increased corrosion of the protective tube 322, or decomposition of the shellside fluid 325. As a result, these changes reduce the risk of leaks at the tube plate but increase the risk of leaks due to hot spots.

In FIG. 5 the risk of leaks due to hot spots is reduced or eliminated by changes to the shell side flow path, 341 and the heater rods 342. The cool fluid 343, enters the side inlet 344 into a chamber 345 formed by the shell 346, the top tube plate 347 and the turning baffle 348. The turning baffle 348 causes the fluid 343 to change its flow path 341 from the initial cross flow to axial flow as shown by the flow arrows 349. Some areas of low flow 350 exist above the turning baffle 348 but the heater rods are modified so that an unheated area exists above the turning baffle by locating the "cold junction", 351 below the top 352, of the turning baffle. The cold junction 351 is at the junction between the heater lead wires 353, and the heater proper 354.

Similar areas of low flow 350 exist below the bottom turning baffle 355, and the heater rods 342 are designed so that the cold toe 356, which has low heat output, begins above the bottom of the turning baffle 357. Between the end of the heater rod 358, and the end of the protective tube 359, is a thermal expansion gap 360, provided to prevent the heater rod 342 from touching the protective tube 359 when it expands during heat-up.

Figure 6:
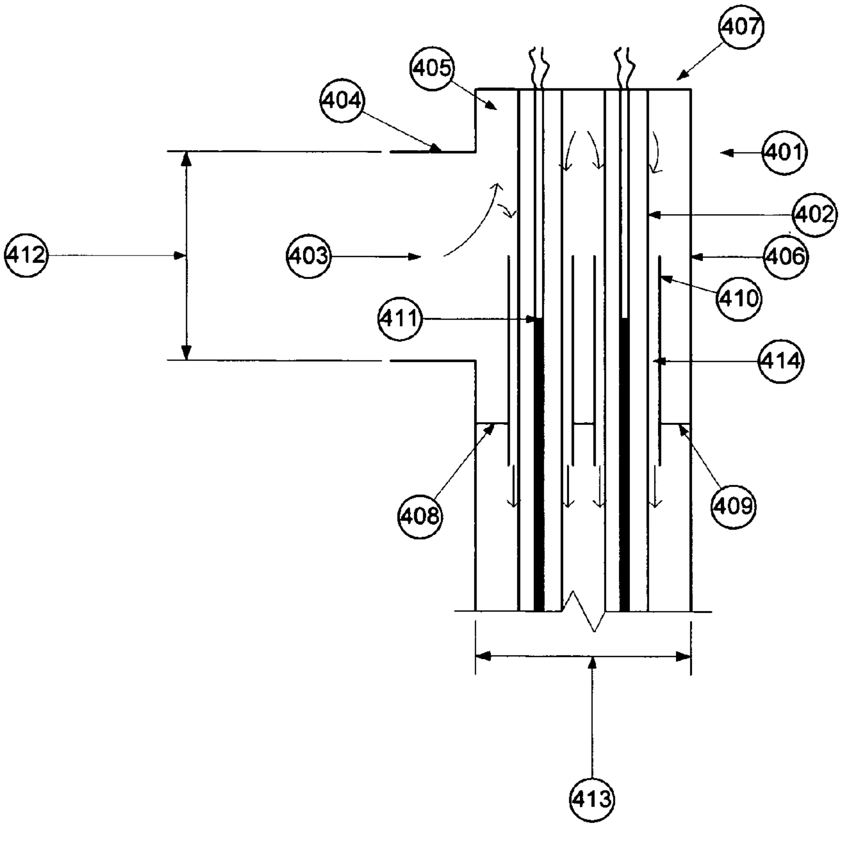
FIG. 6 is a cross sectional view of a heat exchanger incorporating features of the invention including a turning baffle

FIG. 6 is an enlarged cross-sectional flow schematic showing the turning baffle 408 inserted in the shell 406 of a heat exchanger 401. The cool fluid 403 enters the side inlet 404 into a chamber 405 formed by the shell 406, the top tube plate 407 and the turning baffle 408. The turning baffle 408 has two elements, namely a baffle plate 409, which substantially blocks the flow down the exchanger, and shrouds 410, which surround the protective tubes 402 and force the fluid 403 to be evenly distributed through the gaps 414 around each protective tube 402 and straighten the flow so that it becomes axial. The shrouds 410 also protect the protective tubes 402 from the cross-tube flow of the inlet fluid 403, which reduces the forces on the tubes 402 that can cause vibration. The baffle plate 409 is located below the bottom of the side inlet 404 to ensure sealing. The shrouds 410 extend up from the baffle plate 409 preferably to a location about 50% of the height of the side inlet 404. The cold junction 411 is located below the top of the shrouds where the axial flow starts and there is good heat transfer. Thus, a benefit to tall shrouds is that there is more heating length available. On the other hand, the closer the top of the shroud is to the top tube plate 407, the less room there is for the flow to turn, which causes pressure drop and maldistribution. Using a computer to model the flow via finite element analysis can help in optimization for given flow conditions. For good flow distribution and low vibration it is preferred that the inlet diameter 412 be approximately the same as the shell diameter 413.

FIG. 7 shows a detailed cross-sectional schematic of a spider baffle 127 in a single hole 502, in a tube support arrangement typical of those shown as spider baffle 127 in FIG. 1. The protective tube 501 is supported in the center of the hole 502 by three tabs 503. The support of the tabs 503 prevents the tube 502 from excessive movement and vibration. The small size of the tabs 503 provides a large open area 504 for fluid flow and consequently a low pressure drop.

Figure 8:
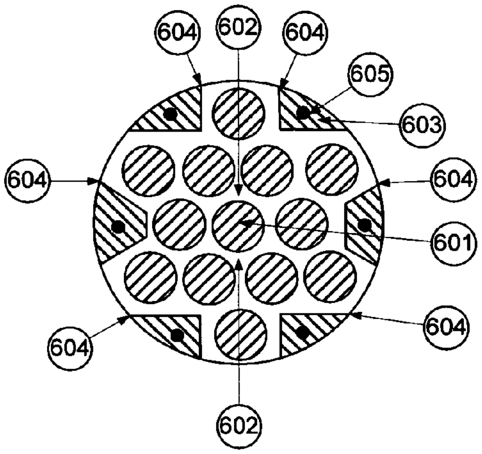
FIG. 8 is a cross sectional view of a protective tube layout showing axial flow baffles and spacers

FIGS. 8, 9, 10 and 11 show cross-sectional schematics of several alternative arrangements of the protective tubes and longitudinal flow baffles. For clarity the protective tubes that have the heater rod within are not individually shown, the combination being represented by a crosshatched circle. In FIG. 8 the protective tubes 601 are laid out in a triangular pattern with relatively equal central gaps 602 and larger gap 603 at some locations along the outer circumference where there is inadequate space for a protective tube. These larger gaps 603 are filled with longitudinal baffles 604 of different shapes so the gaps are more uniform in size. The baffles are held in place with spacer 605, which attach to the tube sheet and the baffles.

Figure 9:
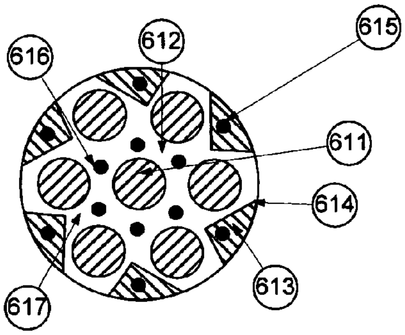
FIG. 9 is a cross sectional view of a protective tube layout showing axial flow baffles and spacers and use of spacers as extended surface area

In FIG. 9 the protective tubes 611 are also laid out in a larger triangular pattern with relatively equal central gaps, 612. There are large gaps 613 at some locations along the outer circumference where there is not enough space for a protective tube. These gaps are also filled with longitudinal baffles 614 of the same shape so the gaps are more uniform. The baffles 614 are likewise held in place with spacers 615 which attach to the tube sheet and the baffles. Additional spacers 616 are also provided to make the gaps between the protective tubes 611 more uniform and to provide extended surface areas. The hot protective tubes 611 radiate to the spacers 616, which then also heat the fluid 617 by conduction and convection.

Figure 10:
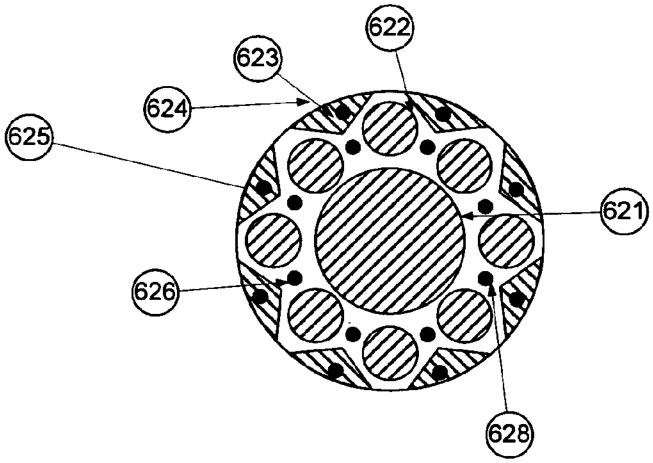
FIG. 10 is a cross sectional view of a protective tube layout including a large center tube used as an axial flow baffle

In FIG. 10 a large tube 621 positioned in the middle is surrounded by a ring of smaller tubes 622. As in the FIGS. 8 and 9 the large gaps 623 at the circumference are filled with longitudinal baffles 624 of the same shape so the gaps are more uniform. The baffles are held in place with spacers 625 which attach to the tube sheet and the baffles. Additional spacers 626 are provided in the gaps between the tubes 621, 622 to further reduce the gap space and to provide extended surface area. The hot protective tubes 621, 622 radiate to the spacers 626 which then heat the fluid 628 by conduction and convection. As a further variant more than one heater rod can be placed in the large protective tube 621.

Figure 11:
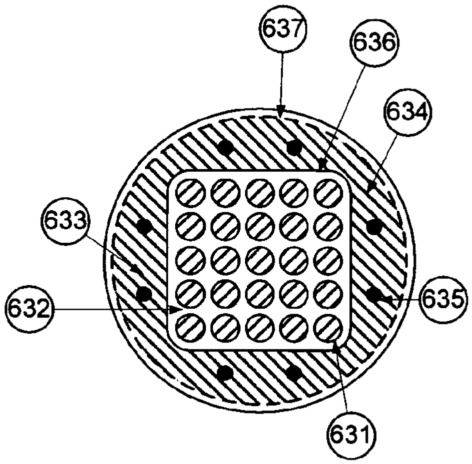
FIG. 11 is a cross sectional view of protective tube layout showing use of square pitched tubes surrounded by an axial flow baffle

In FIG. 11 protective tubes 631 are laid out in the center of the heat exchanger in a square pattern with uniform gaps 632 between the tubes. A large empty area 633 outside the square array is blocked off by a single large baffle 634, consisting of a cross-sectional baffle 637 and a longitudinal baffle 636, which completely surrounds the tubes 631 and serves as an additional heat transfer area. This baffle 634 is closed off to prevent flow through it and supported by spacer 635, as previously described.

Figure 12:
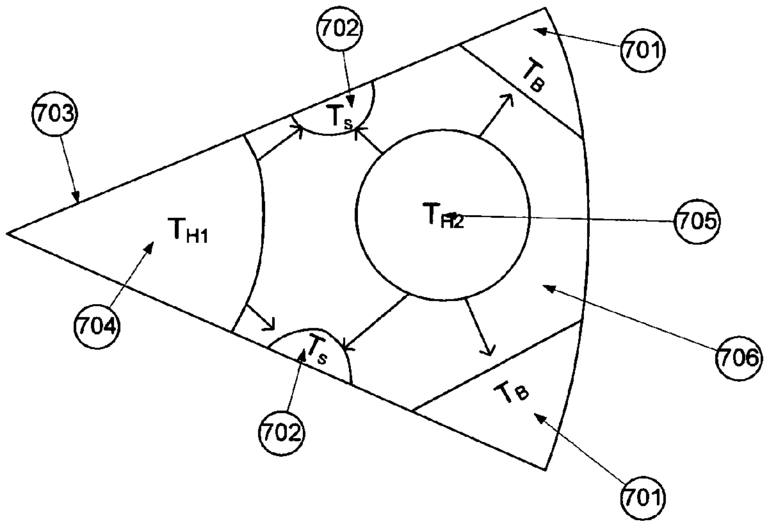
FIG. 12 is a schematic diagram showing a portion of a heat exchanger illustrating an extended heat transfer area provided by use of radiation to a spacer and baffle.

FIG. 12 shows an example of a radiation heat transfer network for calculating the benefit of the extended surface areas provided by the baffles 701 and the spacers 702. The pie shaped section 703, represents a symmetrical section of a heater with a circular cross-section similar to FIG. 10 and is used to reduce the time to calculate the heat transfer in the full cross section. The center heater 704 and the outside heater 705 enclose electrical heater rods which radiate heat to the baffles 701 and the spacers 702. All surfaces are cooled by a fluid 706 flowing perpendicular to the heaters; thus the spacers 702 and baffles 701 act as additional surface area and improve the overall heat transfer.

Figure 13:
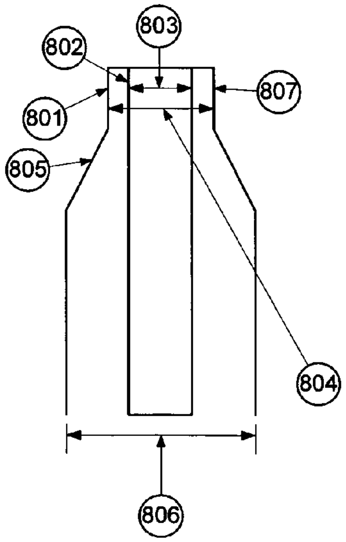
FIG. 13 is a schematic diagram illustrating providing a variable flux by changing the protective tube diameter

FIG. 13 illustrates how changing the diameter of the protective tube 801 can change the flux without changing the linear heat output of the heater rod 802 itself. The diameter 803 of the rod 802 is less than the top diameter 804 of the protective tube 801. Since all the energy from the heater rod 802 flows out through the protective tube 801 the heat flux, i.e., the heat per unit area, at the surface 807 of the protective tube 801, is proportional to ratio of the two diameters. After an expansion section 805 the flux at the surface 807 of the protective tube 801 is lower because the protective tube diameter at the bottom 806 is larger.

Figure 14:
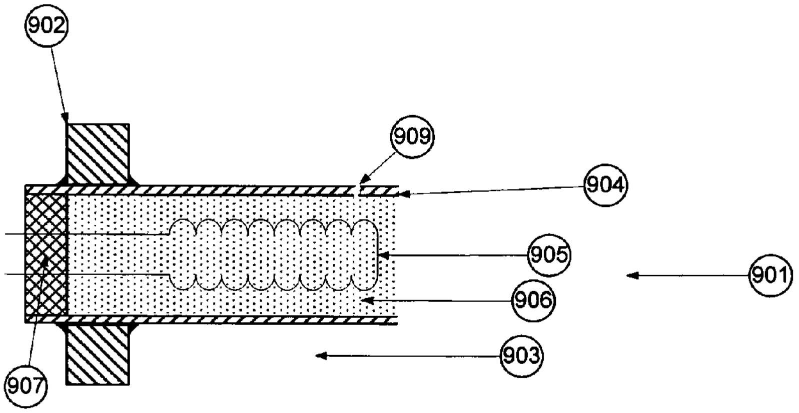
FIG. 14 is a cross sectional view illustrating a prior art use of welding a thin sheathed heater rod into a support plate

FIG. 14 is a cross section of a prior art single heater 901 welded to a support plate 902 which shows some of the disadvantages of the prior art electrical heater with regard to preventing leaks when used in pressurized service. The fluid 903 to be heated surrounds the heater and is isolated from the inside of the heater 901 by a thin metal sheath 904 whose thickness is determined by the swaging technique used to manufacture the heater. The wires 905 inside the heater are insulated by a fine mineral oxide powder 906 which gains much of its insulating properties from the gaps between the particles. The wires extend through a plug of potting compound 907 to the outside of the heater assembly. Once a hole 909 develops in the sheath 904 the fluid 903 which is external to the sheath can flow through the hole 909 and gaps in the insulation to the plug 907 which is not a pressure seal and will eventually fail under the increased pressure causing a release to the environment and possible severe health and safety issues. Since the heater sheath 904 is welded to the support plate 902, when a leak develops the whole support plate has to be removed, the heater cut out and a new heater welded into the assembly. Because this takes a lot of work, people using this prior art heater arrangement tend to tolerate small leaks hoping they will not get worse before it is time for a plant shutdown. While such an attitude is understandable, it can lead to catastrophic failure and very large releases of toxic material.

Figure 15:
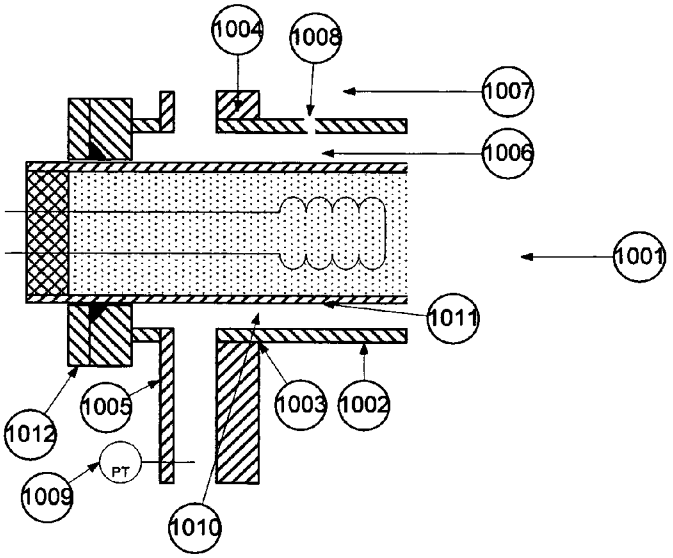
FIG. 15 is a cross sectional view showing the sealing of a heater rod and a protective tube to separate plates.

In contrast the assembly shown in FIG. 15, which incorporates features of the invention, shows a cross section of a single heater, 1001, inside a protective tube 1002 which is first expanded into a hole 1003 in the tube plate 1004 and then seal welded. The heater 1001 is sealed into a separate support plate 1005 using a bored through compression fitting 1012, such as those manufactured by Swagelok, which is welded to the support plate 1005. The gap 1010 between the heater 1001 and the protective tube 1002 can be filled with a fluid 1006, at a pressure lower than the outside fluid 1007. In the event of the formation of a hole 1008, the outside fluid 1007 flows into the gap and increases the pressure of the inside fluid 1006 which is immediately detected by the pressure transmitter 1009. As a result, the operator knows there is a hole but he has some time before a leak occurs to the outside since the sheath 1011 of the heater is a backup pressure barrier. The operator can shut down and purge out the fluid 1007, safely open the heater, lift out the heater support plate 1005 and attached heaters 1001, find the leaky protective tube and plug it as is standard practice in shell and tube heat exchangers, thus sealing the leak. The heater 1001 that would have gone in the faulty protective tube 1002 can then be removed by opening the compression fitting 1012, sealing the fitting 1012 with a standard cap (not shown), reattaching the support plate 1005 and heaters 1001, thus placing the heat exchanger back in operation, albeit at slightly lower power because one less heater is present. This is much faster than removing the support plate, grinding out the faulty heater and rewelding in a new heater and can all be done at the location of the heat exchanger without the need for welding equipment which can cause fires or explosions and is highly regulated. The more likely failure is a ground short inside the heater rod 1001 itself and these failures can easily be detected by testing the lead wires on the outside. Because the operator knows the protective tube 1002 is intact, because the pressure transmitter 1009 shows a low pressure, the compression fitting 1012, can be readily released, the old heater 1001 removed and replaced with a new heater, followed by resealing the fitting 1012.

Figure 16:
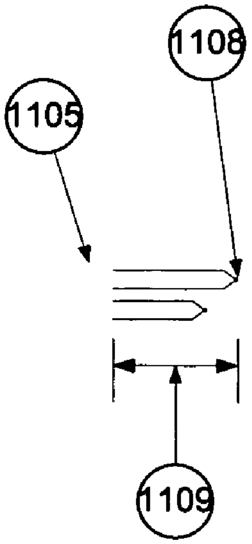
FIG. 16 is a side view of an insertable temperature sensor.
Figure 17:
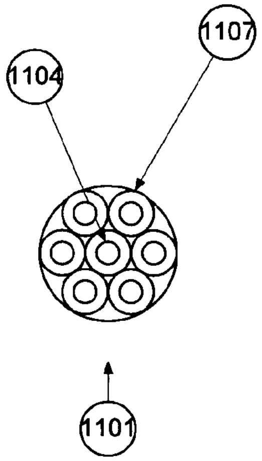
FIGS. 17 and 18 are end and longitudinal views of the heater rod with a center thermowell surrounded by the heater coils.
Figure 18:
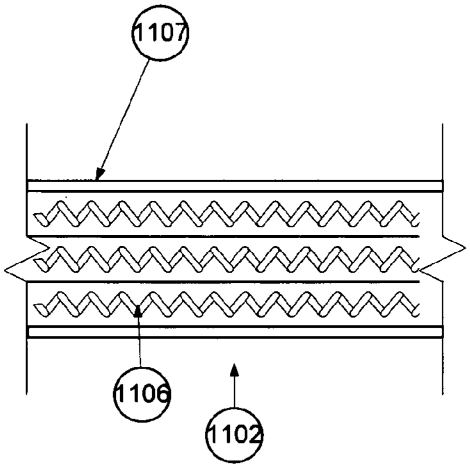

FIGS. 16-18, illustrate a particularly beneficial aspect of the embodiments described as providing the capability of direct measurement of heater temperature at multiple points in the heater. FIG. 17 is an end view 1101 and FIG. 18 is a longitudinal cross section 1102 of a heater rod with six heater coils 1106 surrounding a hollow thermowell 1104 into which a thermocouple or bundle of thermocouples 1105, or other temperature detecting device may be inserted and enclosed in a multicell heater sheath 1107. The use of six coils is particularly advantageous for large industrial heaters which use three phase power as each pair of heater coils can be a complete single phase circuit and thus each multicell heater is directly powered by three phase power which is automatically balanced and a heater can be removed from the system without unbalancing the load on the other heaters. The bundle of thermocouples has different length 1109 thermocouples each of which measures the temperature at its tip 1108, corresponding to different depths within the thermowell 1104

Thus the invention reduces the risk of a leak by providing a dual wall structure with an outer wall and a leak detection mechanism between the walls. Further, avoiding hot spots that could lead to increased corrosion increases operability and heater life is improved by providing information on the heater temperature. Still further, maintainability is improved by providing for individual replacement of heater rods.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An axial flow, electrically heated fluid heat exchanger comprising:

an elongated heat exchanger shell, said shell having a primary tube sheet with one or more electrical heaters extending through said tube sheet into an interior space in the shell, a first port in a side of the shell and one or more additional ports in the side or an end of the shell, said ports providing entrances to and an exits from the shell for fluid feed to the interior space in the shell below the primary tube sheet but exterior to the electrical heaters located within the interior space, a secondary tube sheet spaced from and above the primary tube sheet with a plenum space there between, the primary tube sheet, the secondary tube sheet and the plenum space comprising a first set of tube sheets, the one or more electrical heaters comprising protective tubes, at least one heater rod inside each protective tube, said one or more protective tubes having their outer surface at a first end sealed to the primary tube sheet and a second end spaced from the primary tube sheet having a closed end to form a fluid free space enclosing therein the one or more heater rods, said fluid free space being open to the plenum space, and at least one flow turning baffle located in the interior space below the first set of tube sheets and between one of said ports providing fluid entrance to the shell interior space and one of said ports providing fluid exit from the shell interior space.

2. The axial flow, electrically heated fluid heat exchanger of claim 1 further comprising:

at least a second set of primary and secondary tube sheets separated by a plenum space, said second set spaced axially along the length of the shell from the first set of tube sheets, a second set of electrical heaters extending from the second set of primary and secondary tube sheets, the protective tubes of the second set of electrical heaters connected to the second set primary tube sheet, the secondary tube sheets of the primary and second set of tube sheets being spaced a distance farther than the distance between the primary tube sheets of the first and second set of tube sheets, and at least one additional flow turning baffle located within the interior space between the primary tube sheets of the first and second set of tube sheets.

3. The axial flow, electrically heated fluid heat exchanger of claim 1 wherein the fluid exiting therefrom is feed to one or more additional electrically heated fluid heat exchangers connected in series therewith.

4. The axial flow, electrically heated fluid heat exchanger of claim 2 wherein the fluid exiting therefrom is feed to one or more additional electrically heated fluid heat exchangers connected in series therewith.

5. The axial flow, electrically heated fluid heat exchanger of claim 1 further comprising one or more axial flow baffles located below the primary tube sheet.

6. The axial flow, electrically heated fluid heat exchanger of claim 1 further comprising a pressure seal where each heater rod passes through the secondary tube sheet.

7. The axial flow, electrically heated fluid heat exchanger of claim 6 wherein said pressure seal is provided by a compression fitting, a flange or a metal or elastomeric O-ring sealing device.

8. The axial flow, electrically heated fluid heat exchanger of claim 1 wherein multiple protective tubes of different diameters are sealed to the primary tube sheet.

9. The axial flow, electrically heated fluid heat exchanger of claim 1 further comprising one or more unheated spacers or baffles positioned to adsorb heat radiated from the protective tubes, said spacers or baffles being cooled by the fluid.

10. The axial flow, electrically heated fluid heat exchanger of claim 1 wherein at least one protective tube has at least two portions thereof with different diameters.

11. The axial flow, electrically heated fluid heat exchanger of claim 1 further comprising a conduit extending from the plenum space between the primary and secondary tube sheets and a leak detector located in said conduit for detecting a leak through one or more protective tubes into the fluid free space therein, said leak detector comprising one or more pressure sensors, temperature sensors, density sensors, thermal conductivity sensors, liquid detectors or a gas chromatograph inlet feed port.

12. The axial flow, electrically heated fluid heat exchanger of claim 1 further including thermal insulation in the plenum space.

13. The axial flow, electrically heated fluid heat exchanger of claim 1 further comprising a thermowell extending axially through the center of the one or more electrical heaters, each thermowell having one or more temperature measuring devices positioned therein.

14. The axial flow, electrically heated fluid heat exchanger of claim 1 further comprising one or more spider baffles placed coaxially over the one or more protective tubes.

15. The axial flow, electrically heated fluid heat exchanger of claim 2 further comprising one or more axial flow baffles located between the primary tube sheets.

16. The axial flow, electrically heated fluid heat exchanger of claim 2 further comprising a pressure seal at a location where each heater rod passes through the secondary tube sheets.

17. The axial flow, electrically heated fluid heat exchanger of claim 16 wherein said pressure seal is provided by a compression fitting, a flange or a metal or elastomeric O-ring sealing device.

18. The axial flow, electrically heated fluid heat exchanger of claim 2 wherein multiple protective tubes of different diameters are sealed to the primary tube sheets.

19. The axial flow, electrically heated fluid heat exchanger of claim 2 further comprising one or more unheated spacers or baffles positioned to adsorb heat radiated from the protective tubes, said spacers or baffles being cooled by the fluid.

20. The axial flow, electrically heated fluid heat exchanger of claim 2 wherein at least one protective tube has at least two portions thereof with different diameters.

21. The axial flow, electrically heated fluid heat exchanger of claim 2 further comprising a one or more conduits extending from the plenum space between each set of primary and secondary tube sheets and a leak detector located in said one or more conduits for detecting a leak through one or more protective tubes into the fluid free space therein, said leak detector comprising one or more pressure sensors, temperature sensors, density sensors, thermal conductivity sensors, liquid detectors or a gas chromatograph inlet feed port.

22. The axial flow, electrically heated fluid heat exchanger of claim 2 further including thermal insulation in the plenum spaces.

23. The axial flow, electrically heated fluid heat exchanger of claim 2 further comprising a thermowell extending axially through the center of the one or more electrical heaters, each thermowell having one or more temperature measuring devices positioned therein.

24. The axial flow, electrically heated fluid heat exchanger of claim 2 further comprising one or more spider baffles placed coaxially over the one or more protective tubes.

* * * * *

UNITED STATES PATENT AND TRADEMARK OFFICE

CERTIFICATE OF CORRECTION

PATENT NO. : 8,260,126 B2
APPLICATION NO. : 12/653694
DATED : September 4, 2012
INVENTOR(S) : Stephen Michael Lord It is certified that error appears in the above-identified patent and that said Letters Patent is hereby corrected as shown below:

In the Claims:

Column 10, Claim 1, Line 40, after "said ports providing entrances to and" please delete "an"

Column 10, Claim 2, Line 64, after "separated by a" please add --second--

Column 11, Claim 2, Line 1, before "protective tubes of the second set of electrical" please delete "the"

Signed and Sealed this
Sixteenth Day of July, 2013

Teresa Stanek Rea
*Acting Director of the United States Patent and Trademark Office*